United States Patent [19]

Cohen

[11] Patent Number: 4,646,183
[45] Date of Patent: Feb. 24, 1987

[54] TRACKING HEAD SUSPENSION FOR TAPE DECK

[75] Inventor: William D. Cohen, Huntington, N.Y.
[73] Assignee: North Atlantic Industries, Inc., Hauppauge, N.Y.
[21] Appl. No.: 609,307
[22] Filed: May 11, 1984
[51] Int. Cl.[4] .................. G11B 5/55; G11B 21/08; G11B 5/56; G11B 21/24
[52] U.S. Cl. ...................... 360/106; 360/109
[58] Field of Search ............... 360/104, 105, 106, 107, 360/108, 109, 130.2, 130.21, 130.22

[56] References Cited

U.S. PATENT DOCUMENTS

| 3,624,309 | 11/1971 | Dattilo | 360/106 |
| 4,309,732 | 1/1982 | Kronfeld et al. | 360/105 |
| 4,550,352 | 9/1985 | Nakao | 360/109 |

FOREIGN PATENT DOCUMENTS

| 4615867 | 7/1968 | Japan | 360/109 |

OTHER PUBLICATIONS

H. J. Mueller, Magnetic Stripe Reader/Writer with Improved Head Suspension, vol. 19, No. 5, Oct. 1976, IBM Technical Disclosure Bulletin, pp. 1808–1809.
D. S. Proper, Head Arm Support, vol. 22, No. 2, Jul. 1979, IBM Technical Disclosure Bulletin, p. 503.

Primary Examiner—Robert S. Tupper
Assistant Examiner—Melissa J. Kova
Attorney, Agent, or Firm—Eisenman, Allsopp & Strack

[57] ABSTRACT

A movable support for indexing a recording head across the face of a recording tape in a deck in precision steps free of backlash and angular movement out of the normal plane of the tape and in which a pair of parallel, matched leaf springs carrying the recording head by their outer ends are anchored at their inner ends to a block adjustably secured to the frame of the tape deck such that the effective length of at least one of the leaf springs can be changed.

9 Claims, 5 Drawing Figures

TRACKING HEAD SUSPENSION FOR TAPE DECK

BACKGROUND OF THE INVENTION

This invention relates to tape decks for multi-track recording tapes and more particularly to the subassembly for movably supporting recording heads for precision positioning across the face of the tape.

Accurate head positioning is essential to efficient data storage and retrieval. In the case of tape used in the computer industry, refinements and improvements in tape and head designs at the present state of development allow 16 recording tracks on a tape one quarter inch wide. The design criteria require a head supporting and indexing system which is virtually free of backlash and in which the face of the recording head, as it assumes its 16 positions across the face of the tape, undergoes almost no angular or tilting movement out of the normal plane of the tape.

It is, therefore, an object of the present invention to provide a movable recording head supporting and indexing assembly which is free of backlash even after extended use and which precludes angular movement of the precision recording face out of the established plane of the tape.

Another object of the invention is to provide reliable and simple adjusting means to establish the initial correct planar relationship between the recording face of the head and the normal plane of the recording tape as well as initial perpendicularity between the vertical axis of the head and the horizontal axis of the tape.

SUMMARY OF THE INVENTION

In accordance with the invention a bearing free and, therefore, backlash free movable support is provided for the head by means of at least a pair of parallel leaf springs rigidly secured respectively at their outer ends to vertically spaced apart points on the recording head. The inner ends of the leaf spring are normally rigidly secured to a supporting block in turn normally rigidly secured to the frame of the tape deck. In this fashion the head is constrained against movement any component of which is in the plane of the leaf springs due to the inability of the springs to flex in that direction. Movement is possible only in the direction of flexure of the two parallel leaf springs and it is this direction of movement which is matched precisely with the normal plane of the recording tape. The inherently bearing free suspension will, therefore, be free of backlash throughout its entire working life. Also when flexed together the two springs will assume matching curvatures so that their respective lengths will change equally thus maintaining vertical axis of the supported head always perpendicular to the movement of the tape.

To establish the initial matching planar relationship between the plane of the tape and the plane of the recording face of the head over which the tape moves, the angular position of the supporting block is made adjustable along an axis parallel to the direction of tape movement by means of an adjustment preferably in the form of a lead screw and a slide rocking mount between the supporting block and the frame of the tape deck. The correct perpendicularly between the vertical axis of the head and the axis of movement of the tape across the head is established in accordance with the invention by adjustably changing the relative effective lengths of the two leaf springs. This is accomplished by a releasable clamp for at least one of the leaf springs and the support block and an adjusting device preferably in the form of a lead screw which shifts the leaf spring toward or withdraws it from the direction of the recording head after which clamping is reestablished.

The indexing motion of the movably supported head is effected by means of an axially movable shaft coupled to the head in a resilient or flexible joint with its axis substantially but not necessarily prefectly perpendicular to the direction of tape movement and contained substantially in a plane parallel to the plane of the tape. The shaft is driven axially to and fro by a precision stepper motor of conventional design. The slight degree of freedom afforded by the resilience of the coupling of the shaft to the head assures that the angular position of the head will be established at all times by the leaf spring support rather than by the precision positioning of the axis of the stepper motor.

DESCRIPTION OF THE PREFERRED EMBODIMENT

Figure 1:
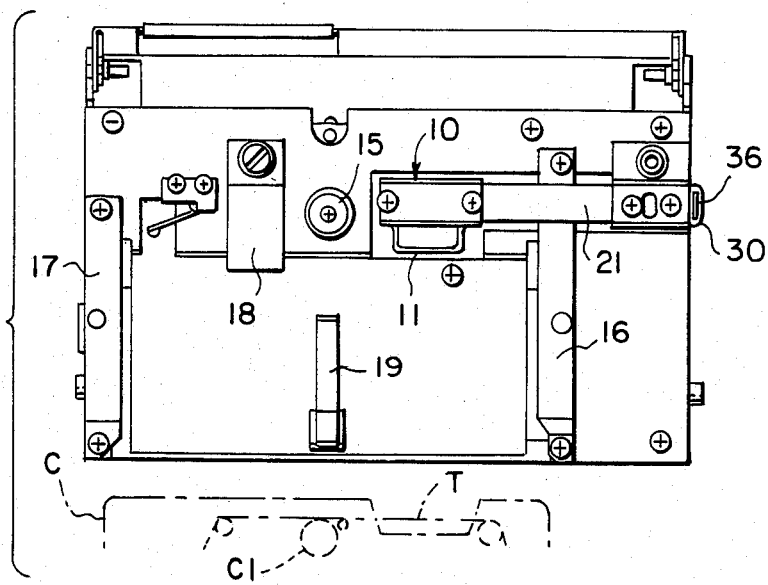
FIG. 1 is a top view of tape deck mechanism embodying the present invention.
Figure 2:
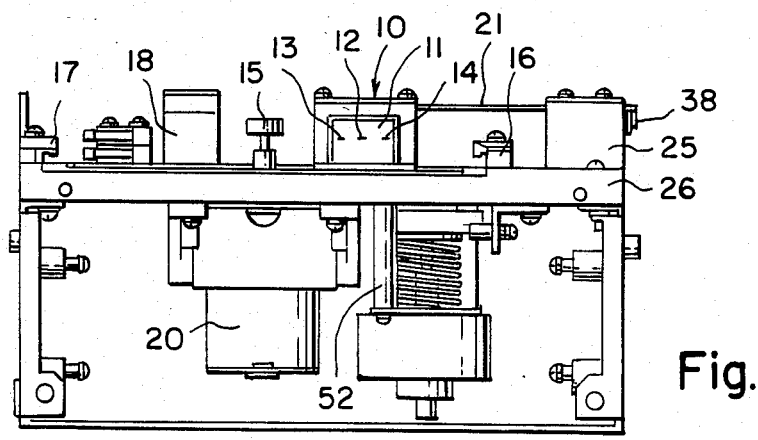
FIG. 2 is a view in side elevation of the front of the tape deck.
Figure 3:
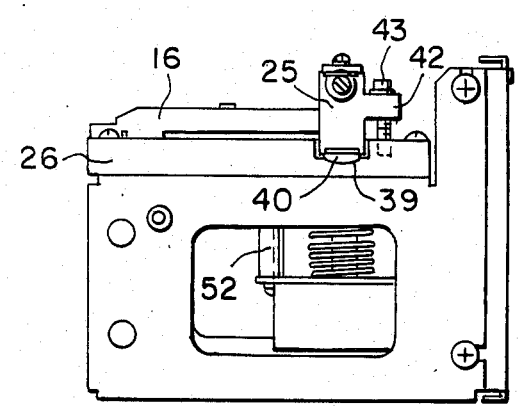
FIG. 3 is a view in end elevation of the right hand end of the tape deck.

Referring to FIGS. 1-3 of the drawing, there is shown, removed from its protective housing, a tape deck assembly which includes a transducer head 10 which can be of conventional design, typical of which is a head having on its forward side (best seen in FIG. 2) a tape engaging surface 11 with central read/write slots 12 for forward tape motion, second read/write slots 13 for reverse motion and an erase slot 14. The tape deck accommodates a precision standardized tape cartridge C, the forward edge of which is shown in phantom lines in FIG. 1 and within which the tape T passes between reels when driven by a capstan C-1 in the cartridge which is in turn driven by a friction wheel 15 within the deck. In order to position the cartridge C precisely within the deck to bring the recording surface of the tape T into engagement with the surface 11 of the head 10 the deck includes a pair of edge guide rails 16 and 17, a precision stop 18 and a cartridge locking and positioning spring 19 to press the reference plane surface of the cartridge upward against three precision reference points in the deck. When fully home within the deck the friction wheel 15 driven by a motor 20 engages a capstan within the cartridge which drives tape T while the tape forms a shallow wrap around the head 10.

Figure 4:
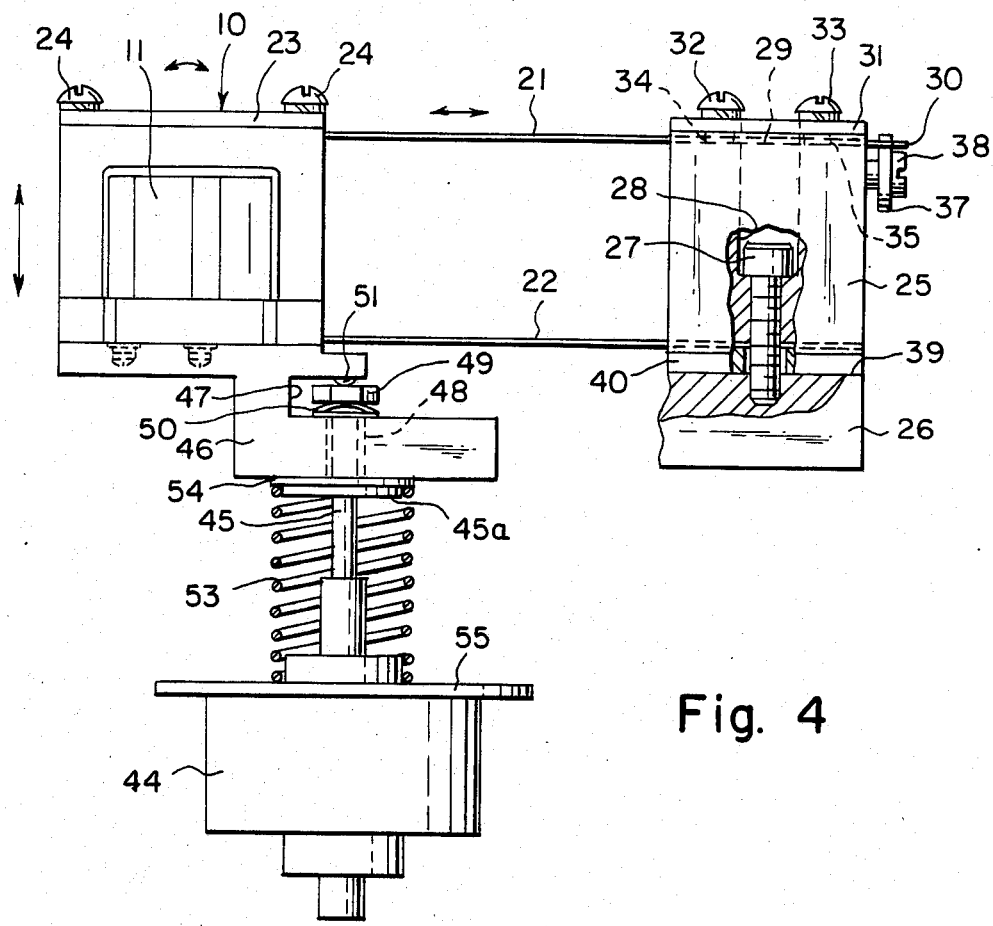
FIG. 4 is a fragmentary view showing in enlarged scale and in side elevation a sub-assembly of the tape deck including the movable support for the recording head and the mechanism for indexing the head across the face of the recording tape for track selection.
Figure 5:
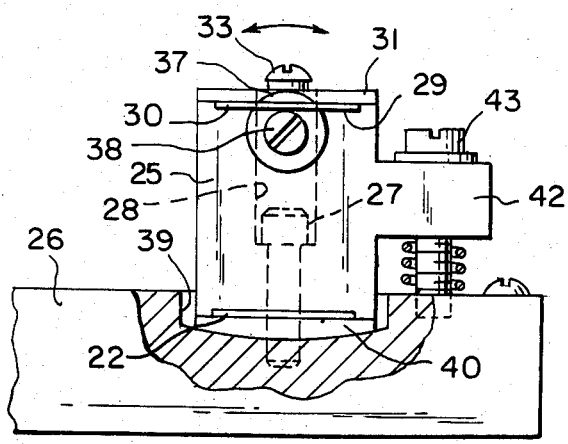
FIG. 5 is a view in right hand end elevation of the sub-assembly of FIG. 4.

The tape deck is designed to accommodate multi-track tapes in which as many as sixteen closely spaced recording tracks are disposed side by side across the relatively narrow recording surface or face of the tape, requiring extreme precision within the tape deck in the positioning and indexing of the transducer head 10. To this end the supporting and indexing mechanism for the transducer head 10, best shown in FIGS. 4 and 5, is designed so that the tape engaging face 11 is at all times precisely parallel to the recording face of the tape while free of any cocking or tilting motion about an axis perpendicular to the recording tape. The head 10 is carried by two matched precision leaf springs 21 and 22 firmly attached respectively to its top and bottom surfaces. In FIG. 4 the attachment of the upper leaf spring 21 is seen as including a clamping plate 23 secured by mounting screws 24.

The opposite ends of the leaf springs 21 and 22 are secured to a support block 25 rigidly secured to the frame 26 by a mounting screw 27 set in a recess 28 at the top of the block. In the illustrated embodiment of the invention, the lower leaf spring 22 is immovably secured to the bottom and the upper leaf spring 21 is adjustably secured to the top of the block 25. As best seen in FIG. 4, the upper leaf spring 21 is seated in a channel 29 with its right hand end 30 projecting beyond the support. The position of the leaf spring 21 is secured by a clamping plate 31 held by mounting screws 32 and 33 which pass through enlarged holes or slots 34 and 35 in the leaf spring. The projecting end 30 of the leaf spring 21 is formed with a transverse slot 36 (FIG. 1) into which projects the enlarged head 37 of an adjusting screw 38 tapped into the support block 25. The effective length of the leaf spring 21 is changed by releasing the clamping plate 31 and turning the adjusting screw 38 to either shorten or lengthen the leaf spring 21 as might be required to cause the recording head 10 to rotate into a precisely vertical attitude as is required for precision interaction with the recording tape.

It is also essential that the working face 11 of the head 10 be disposed precisely parallel to the surface of the recording tape so that when the tape is pressed against the head by inserting the cartridge C into the deck the tape will not twist, but will wrap uniformly about the contoured face. To effect this adjustment, the support block 25 is mounted for tilting movement in the frame piece 26 in an arcuately contoured recess 39 on which rests a similarly contoured rocker piece 40. A mounting screw 27 tapped into the frame 26 secures the assembly. When the mounting screw 27 is backed off, the support 25 can be rocked in adjusting movement by means of an arm 42 extending from the side of the block and which is driven by an adjusting screw 43. In this fashion, the two parallel planes continuing the leaf springs 21 and 22 can be brought into a precisely perpendicular relationship with respect to the recording face of the tape. The two leaf springs 21 and 22 will constrain the recording head to move vertically upward or downward with no component of rotary or tilting motion about an axis perpendicular to the face of the tape, thus enabling the recording head to be moved with precision from track to track.

The positioning of the recording head across the width of the tape is controlled by a conventional stepper motor 44, the output shaft 45 of which moves up and down in precise increments corresponding to the spacing between tracks. The output shaft 45 of the stepper motor 44 is coupled to the recording head 10 by a connecting arm 46 rigidly secured to the base of the head 10. The coupling arm 46 includes a slot 47 entered from the bottom by enlarged hole 48 through which the stepper shaft passes a nut 49 secured to the top of the stepper shaft within the slot 47 couples the stepper shaft to the arm 46 through a resilient coupling free of back lash formed by the compressed spring washer 50. The upper end of the stepper shaft bears against a bearing point 51 in the upper surface of the slot 47.

The stepper motor 44 is rigidly secured to the frame of the tape deck by suitable mounting posts 52 (one of which is shown in FIGS. 2 and 3). A compression spring 53 reacts between a pressure plate 54 seated on a shoulder 45a on the shaft 45 and the top surface 55 of the stepper motor 44 to maintain continuous pressure on the shaft in an upward direction i.e. away from the motor housing 44 and therefore free of back lash.

I claim:

1. In a tape deck for reading or writing multi-track record tapes having recording surfaces, a transducer head, means for supporting the tape to be driven past the head for data interchange and means to effect track selection by relative positioning movement between the head and the tape transversely across the recording surface, the invention comprising:
   a pair of parallel spaced apart leaf springs disposed in parallel planes both perpendicular to the recording surface of the tape at the transducer head;
   support means attached to corresponding ends of both leaf springs;
   means to secure the ends of the leaf springs remote from said support means to the head at spaced apart points to support the head in recording proximity to the tape;
   means to displace the head selectively across the surface of the tape, thereby flexing the leaf springs to constrain the head to move in a plane parallel to the plane of the recording surface of the tape with a component of motion transverse with respect to the direction of tape movement while constraining the head against turning movement, and means to adjustably turn the head about an axis perpendicular to the plane containing the recording surface of the tape to align the head precisely with the direction of tape movement comprising means to change the effective length of at least one of the leaf springs between the head and the support means.

2. Apparatus as set forth in claim 1, said means to adjustably turn the head including releasable clamp means to hold at least one of the leaf springs on its support means and screw means to shift the leaf spring longitudinally on its support means.

3. Apparatus as set forth in claim 2, said including guide means on the support for the leaf spring to engage the leaf spring to restrict it to longitudinal movement.

4. Apparatus as set forth in claim 2, said means to shift the leaf spring comprising a lead screw reacting between the spring and the support means.

5. Apparatus as set forth in claim 2, including a common block to support both leaf springs, at least one of said leaf springs including longitudinal guide slots means in its surface adjacent the block and clamping screw means received in the slot means.

6. Apparatus as set forth in claim 5, said lead screw being threaded into the block and having an enlarged head portion and said leaf spring overhanging the block, and an aperture, formed in the leaf spring adjacent the lead screw to receive the head portion of the lead screw in axially driving relationship.

7. Apparatus as set forth in claim 1, said second means including a pivotal mount for said support means for the leaf springs affording pivotal movement about an axis parallel to the plane the recording surface of the tape and means to pivot the support.

8. Apparatus as set forth in claim 1, said means to pivot the support means including a pivot arm projecting laterally from the support means and an adjusting lead screw coupled to the pivot arm.

9. Apparatus as set forth in claim 1, said means to displace the head including a control arm extending from the head, and a stepper motor coupled to the control arm to shift the head laterally, said stepper motor including an axially movable output shaft, a control arm secured to the head and a resilient coupling joining the output shaft to the control arm.

* * * * *

UNITED STATES PATENT AND TRADEMARK OFFICE
CERTIFICATE OF CORRECTION

PATENT NO. : 4,646,183

DATED : February 24, 1987

INVENTOR(S) : William D. Cohen

It is certified that error appears in the above-identified patent and that said Letters Patent is hereby corrected as shown below:

Col. 4, Line 35, should start a new paragraph after "and".

Signed and Sealed this

Twenty-fifth Day of August, 1987

Attest:

DONALD J. QUIGG

Attesting Officer

Commissioner of Patents and Trademarks